(12) United States Patent
Collins et al.

(10) Patent No.: US 9,140,217 B2
(45) Date of Patent: Sep. 22, 2015

(54) EXHAUST GAS RECIRCULATION APPARATUS AND METHOD FOR FORMING SAME

(75) Inventors: Ryan Collins, Addison, IL (US);
Michael Murphy, Naperville, IL (US);
Thomas Carney, Batavia, IL (US);
Timothy Maurice Walsh, Oswego, IL (US)

(73) Assignee: Senior IP GmbH, Schaffhausen (CH)

( * ) Notice: Subject to any disclaimer, the term of this patent is extended or adjusted under 35 U.S.C. 154(b) by 361 days.

(21) Appl. No.: 13/605,896

(22) Filed: Sep. 6, 2012

(65) Prior Publication Data

US 2014/0060504 A1    Mar. 6, 2014

(51) Int. Cl.
*F02M 25/07*    (2006.01)

(52) U.S. Cl.
CPC ........... *F02M 25/0737* (2013.01); *Y02T 10/121* (2013.01); *Y10T 29/4935* (2015.01); *Y10T 29/49373* (2015.01)

(58) Field of Classification Search
CPC .......... F02M 25/0707; F02M 25/0731; F02M 25/0734; F02M 25/0737; Y10T 29/4935; Y10T 29/49378
USPC .................. 123/568.12; 165/167; 29/890.03, 29/890.043, 890.045, 890.046
See application file for complete search history.

(56) References Cited

U.S. PATENT DOCUMENTS

| | | | |
|---|---|---|---|
| 6,374,911 B1 | 4/2002 | Olson et al. | |
| 6,460,520 B1 | 10/2002 | Challis | |
| 7,380,544 B2 | 6/2008 | Raduenz et al. | |
| 7,614,389 B2 * | 11/2009 | Ruckwied | 123/568.12 |
| 2001/0047861 A1 | 12/2001 | Maeda et al. | |
| 2008/0223563 A1 | 9/2008 | Penny et al. | |
| 2011/0308778 A1* | 12/2011 | Tsuda et al. | 165/157 |

FOREIGN PATENT DOCUMENTS

| | | |
|---|---|---|
| CN | 202707289 U | 1/2013 |
| JP | 2005214586 A2 | 8/2005 |

OTHER PUBLICATIONS

Written Opinion of ISA on PCT/US13/58032, dated Jan. 24, 2014, 5 pages.
ISR issued on PCT/US13/58032, mailed Feb. 7, 2014, 2 pages.
Borg Warner, EGR Coolers, 2011, 2 pages, borgwarner.com.

* cited by examiner

*Primary Examiner* — Hai Huynh
(74) *Attorney, Agent, or Firm* — Richard D. Harris; Greenberg Traurig, LLP

(57) ABSTRACT

An exhaust gas recirculation cooler for internal combustion engines and a method of forming same. One or more cooler tubes incorporate a flexible section, comprised of one or more integrally formed convolutions, with a tube and fin architecture. The exhaust gas recirculation cooler provides thermal compensation, on a per-tube basis, with the flexible sections of the one or more cooler tubes individually displacing upon the thermal expansion of any of the respective tubes.

16 Claims, 6 Drawing Sheets

EXHAUST GAS RECIRCULATION APPARATUS AND METHOD FOR FORMING SAME

FIELD OF THE INVENTION

The present disclosure relates to exhaust gas recirculation systems for internal combustion engines, in particular, exhaust gas recirculation coolers.

BACKGROUND OF THE DISCLOSURE

Modem internal combustion engines have, for many years, been equipped with exhaust gas recirculation mechanisms for routing exhaust gas from their own internal combustion processes back into their intake manifolds, in order to increase efficiency and/or limit the production of undesirable exhaust components, such as nitrogen oxide. For example, introducing exhaust gas into a combustion mixture in an engine's cylinder is known to lower the combustion temperature and, in turn, reduce the formation of nitrogen oxide, as nitrogen oxide forms at elevated temperatures. In order to reduce those elevated temperatures, it is known to cool exhaust gas before introducing it to the combustion mixture. While typical exhaust gas recirculation cooler applications reduce the temperature of exhaust gas from 650° C. to 120° C., the specific cooling requirements for the recirculated gases will often vary according to engine size, type and application.

Typical exhaust gas recirculation coolers are coupled to the internal combustion engine's overall cooling system, and pass exhaust gas through cooling tubes, which are cooled by the engine's radiator coolant. Exhaust gas recirculation coolers have proven to be some of the most complex and historically unreliable pieces of a modern internal combustion engine. These issues have only been exacerbated by the increase in importance as focus has increased on emissions performance and the efficiency of internal combustion engines.

Exhaust gas recirculation coolers must operate under two primary loading mechanisms—thermal fatigue and thermal shock. Thermal fatigue refers to the thermal stresses encountered by exhaust gas recirculation coolers during normal operation. Thermal shock refers to abnormal operating conditions of exhaust gas recirculation coolers, such as the loss of coolant through broken pumps, cooling line failure, etc. Thermal shock is often accompanied by metal expansion of longitudinally oriented exhaust gas recirculation cooler components.

Metal expansion during thermal shock in an exhaust gas recirculation cooler may cause the exhaust gas recirculation cooler to rupture or leak, which, in turn, may negatively impact the overall engine performance. With a cooler leak, coolant may enter the path of the recirculated exhaust gas—back into the intake manifold and, ultimately, the engine cylinder. Any coolant in the engine cylinders impedes the engine's performance and, at certain levels, may completely inhibit the cylinders from firing. Furthermore, if coolant is leaking out of an exhaust gas recirculation cooler, the engine's overall cooling system is affected by that coolant loss. Finally, a leaking exhaust gas recirculation cooler itself may fall to perform its own function—that is to cool the exhaust gases being recirculated to the intake manifold. As set forth above, an elevated temperature of the combustion mixture may lead to undesirable engine and emissions performance.

Two styles of exhaust gas recirculation cooler are known to provide thermal compensation features which accommodate some metal expansion to resist such failure during extreme thermal shock operating conditions. First, it is known for exhaust gas recirculation coolers to employ round, corrugated or convoluted, hollow cooling tubes, which bow and flex to accommodate metal expansion. However, such hollow, round, corrugated tubes have power density limitations, that is, a relatively limited ability to cool exhaust gases passing therethrough, for a given size of tube, as compared to other known constructions for cooler tubes.

Second, it is known to employ floating cores with cooler tubes with relatively higher power density capabilities, such as those with a tube and fin architecture. Cooling tubes with a tube and fin architecture are relatively flattened or oval shaped, with a fin structure bonded inside of a tube, creating an extremely stiff assembly—which expands without compromise under thermal shock conditions. A floating core approach is known to provide a two-piece exhaust manifold, jointly coupled to all of the cooling tubes, which two pieces are movably coupled with an O-ring connection. When the cooling tubes expand, the exhaust manifold components can move relative to each other along the O-ring connection. Such a macro-compensating feature is limited in its effectiveness, however, as exhaust gas recirculation coolers typically do not experience thermal shock on a uniform, macro-scale. Rather, thermal shock conditions typically result in non-uniform expansion of cooling tubes.

Accordingly, an exhaust gas recirculation cooler with relatively high power density and improved thermal shock performance is desirable.

SUMMARY OF THE INVENTION

The present disclosure provides an improved exhaust gas recirculation cooler comprising an elongated, hollow main body, first and second end plates coupled to opposing ends of the main body, and at least one cooler tube assembly coupled between the first and second end plates. The at least one cooler tube assembly includes an elongated tube member with a substantially oval cross-sectional shape and a fin sheet extending into at least a portion of the tube member. The at least one tube member has at least a first convolution integrally formed therein, the first convolution defining a relatively flexible section of the at least one cooler tube assembly. The tube member and the fin sheet are restrainably bonded within a relatively rigid section of the at least one cooler tube assembly, separate from and integrated with the relatively flexible section of the at least one cooler tube assembly. The relatively flexible section of the at least one cooler tube assembly displaces upon thermal expansion of the at least one cooler tube assembly, to limit mechanical stresses in the first and second end plates.

The improved gas recirculation cooler further comprises a plurality of cooler tube assemblies coupled between the first and second end plates and spaced apart from one another. The plurality of cooler tube assemblies each include an elongated tube member with a substantially oval cross-sectional shape and a fin sheet extending into at least a portion of the tube member. The plurality of elongated tube members further include at least a first convolution integrally formed therein, the first convolution of each the tube member defining a relatively flexible section of the respective cooler tube assembly. Each tube member of the plurality of tube members including a fin sheet that is restrainably bonded within a relatively rigid section of the cooler tube assembly, separate from and integrated with the relatively flexible section of the respective tube assembly. The relatively flexible section of the respective cooler tube assembly displaces independently from the remainder of the plurality of cooler tube assemblies upon thermal expansion of the respective cooler tube assembly, to limit the mechanical stresses generated within the first and second respective end plates.

In some preferred embodiments, the tube member has a plurality of convolutions integrally formed therein, the plurality of convolutions defining the relatively flexible section of the at least one cooler tube assembly.

In some preferred embodiments, the tube member has a first thickness at the relatively rigid section of the at least one cooler tube assembly and the tube member has a second thickness at the first convolution, and the first thickness and the second thickness are substantially equal.

In some preferred embodiments, the first convolution is proximate a first end of the tube member.

The improved gas recirculation cooler further comprises an exhaust inlet coupled to a first end of the at least one cooler tube assembly for conducting flow on exhaust gas. The exhaust inlet is configured for coupling to the exhaust manifold of an internal combustion engine. The improved gas recirculation cooler further comprises an exhaust outlet coupled to a second end of the at least one cooler tube assembly at a position substantially opposite the first end. The exhaust outlet is configured for coupling to the intake manifold of an internal combustion engine.

The improved gas recirculation cooler further comprises a coolant inlet and a coolant outlet. The coolant inlet and the coolant outlet are configured for coupling to the coolant system of an internal combustion engine. The main body further includes a coolant inlet aperture fluidly coupled to the coolant inlet and a coolant outlet aperture fluidly coupled to the coolant outlet, such that coolant travels generally longitudinally through the main body between the coolant inlet and the coolant outlet.

In some preferred embodiments, the tube member is fabricated of stainless steel.

In some preferred embodiments, the tube member and the fin sheet are restrainably bonded to one another through a braised attachment interface.

The present disclosure also provides a method for forming an improved exhaust gas recirculation cooler, comprising forming an elongated tube with a substantially oval cross-sectional shape; integrally forming at least a first convolution in the tube to define an integrated flexible tube portion; inserting a fin sheet within the tube, in a position spaced longitudinally apart from the flexible tube portion; restrainably bonding the relative positioning of the fin sheet within the tube; and coupling the tube substantially between opposing ends of a cooler case with the flexible tube portion positioned proximate to one of the opposing ends of the cooler case. The flexible tube portion of the tube displaces upon the thermal expansion of the tube.

The method for forming an improved exhaust gas recirculation cooler further comprises substantially maintaining the thickness of the tube at the first convolution.

In some preferred embodiments, restrainably bonding the tube and the fin sheet includes braising the fin sheet within the tube.

In some preferred embodiments, integrally forming at least the first convolution in the tube to define the integrated flexible tube portion includes mechanically bulging the first convolution.

The method for forming an improved exhaust gas recirculation cooler further comprises successively integrally forming a second convolution in the tube, the first and second convolutions collectively defining the integrated flexible tube portion.

The method for forming an improved exhaust gas recirculation cooler further comprises contemporaneously integrally forming at least the first convolution and a second convolution in the tube, the first and second convolutions collectively defining the integrated flexible tube portion.

In some preferred embodiments, integrally forming at least the first convolution in the tube to define the integrated flexible tube portion includes hydroforming of the first convolution.

DETAILED DESCRIPTION

The present disclosure is further described with reference to the accompanying drawings, which show particular embodiments of the disclosure. However, it should be noted that the accompanying drawings are merely exemplary. For example, the various elements and combinations of elements described below and illustrated in the drawings can vary to result in embodiments which are still within the spirit and scope of the present disclosure.

Figure 8:
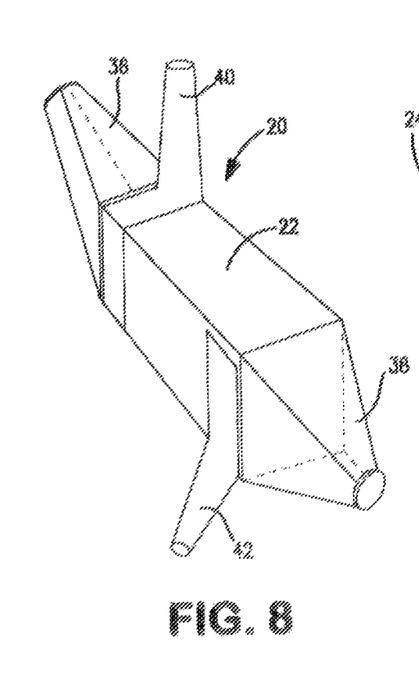
FIG. 8 is a perspective view of an exhaust gas recirculation cooler assembly according to the principles of the present disclosure.
Figure 9:
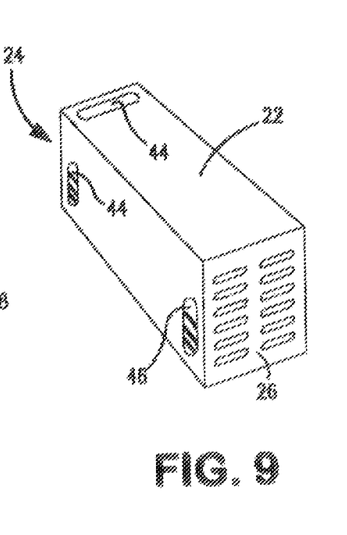
FIG. 9 is a perspective view of an assembly of elongated oval cooler tubes for an exhaust gas recirculation cooler according to the principles of the present disclosure.
Figure 10A:
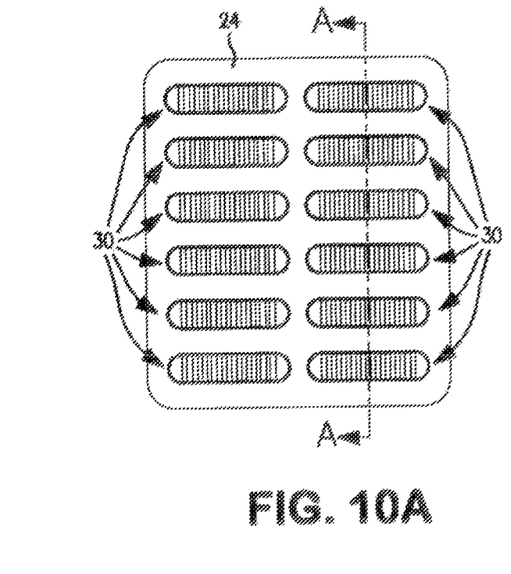
FIG. 10A is an elevated end view of the assembly of cooler tubes of FIG. 9.
Figure 10B:
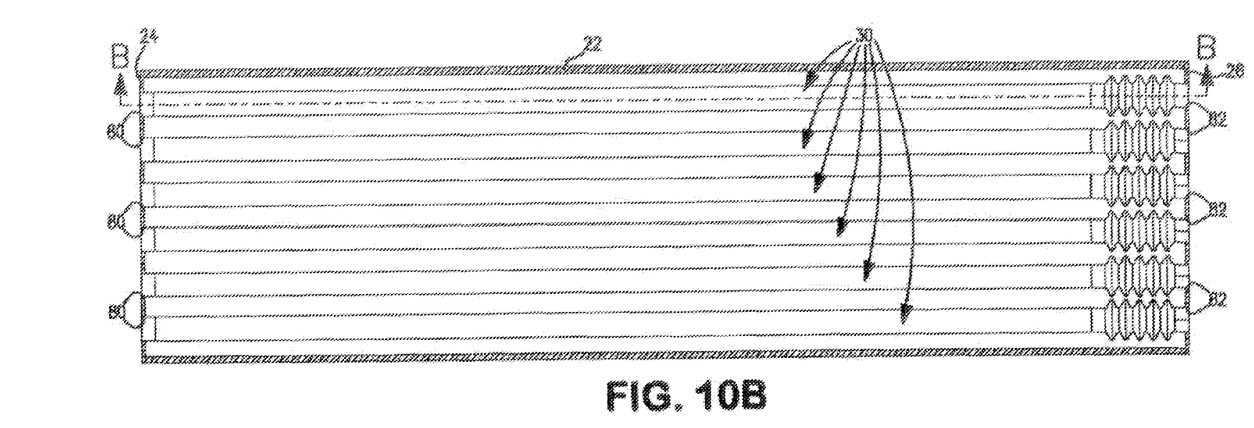
FIG. 10B is a side cross-sectional view of the assembly of cooler tubes of FIG. 10A taken along the line A-A of FIG. 10A and looking in the direction of the arrows of line A-A.
Figure 10C:
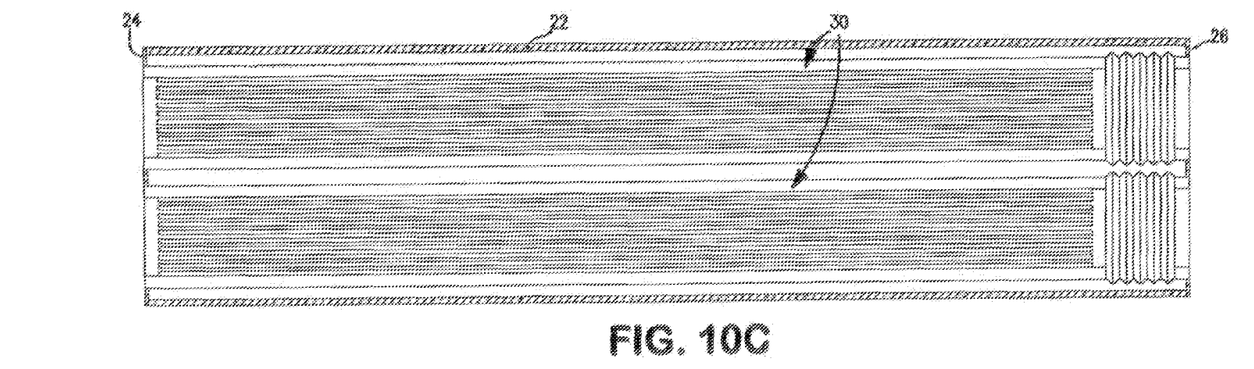
FIG. 10C is a top plan cross-sectional view of the assembly of cooler tubes of FIG. 10B taken alone line B-B of FIG. 10B and looking in the direction of the arrows of line B-B.

With reference to FIGS. 8-10, exemplary exhaust gas recirculation cooler 20 includes main body 22 and first and second end plates 24, 26 encasing cooler tube assemblies 30, which are arranged in an array in the illustrated embodiment. Exhaust gas recirculation cooler 20 is capable of being coupled to the exhaust manifold of an internal combustion engine via exhaust inlet 36, and is configured to direct the exhaust gases back toward the engines intake manifold via exhaust outlet 38, after the exhaust gases pass through cooler tube assemblies 30. It should be understood that, according to the principles of the present disclosure, exhaust gas recirculation cooler 20 can include a single cooler tube assembly 30 or a varying number of cooler tube assemblies 30, which components may be arranged in a variety of configurations. Thus, it should be understood that the particular configuration of the exhaust gas recirculation cooler 20 of the present disclosure is exemplary in nature.

Exhaust gas recirculation cooler 20 is configured to operate with a coolant system via coolant inlet 40 and coolant outlet 42. Coolant is delivered from the coolant system to coolant inlet 40 and enters main body 22 through coolant inlet apertures 44. The coolant travels generally longitudinally through main body 22, drawing heat from cooler tube assemblies 30 and the exhaust gases passing therethrough. Coolant exits main body 22 through coolant outlet aperture 46 and is directed back into the coolant system via coolant outlet 42. It should be understood that, according to the principles of the present disclosure, exhaust gas recirculation cooler 20 can be configured to operate with a wide variety of internal combustion engines, including gasoline and diesel engines, and the particular components and systems thereof, such as coolant systems, and, thus, the particular configuration of the exhaust gas recirculation cooler 20 of the present disclosure is exemplary in nature.

Figure 4:
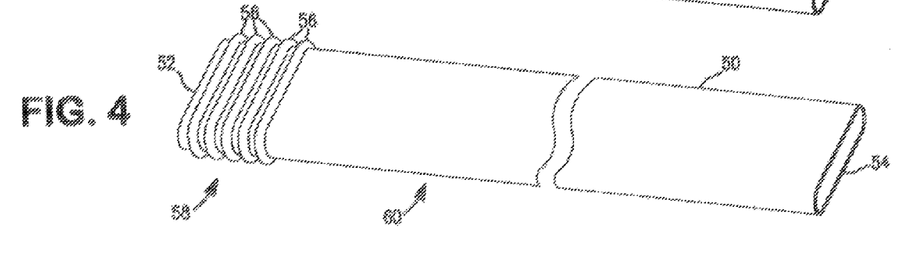
FIG. 4 is a perspective view of an elongated oval cooler tube with five convolutions formed therein according to the principles of the present disclosure.
Figures 5A, 5B, 5D:
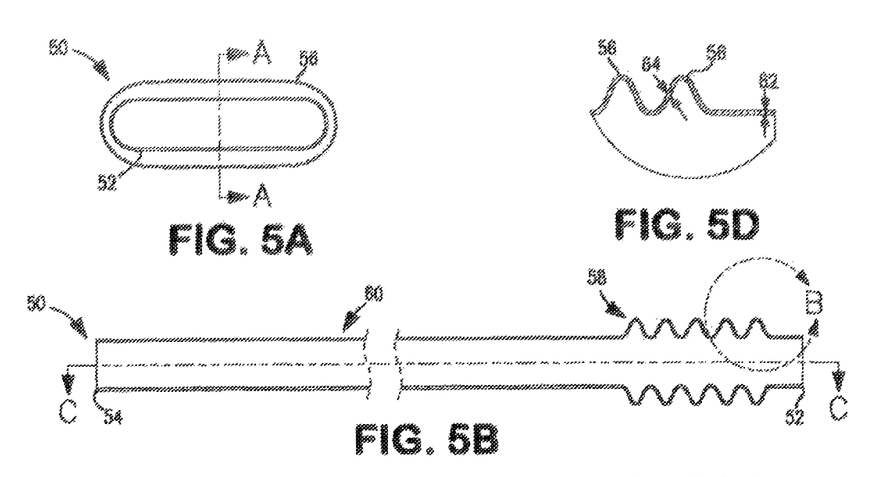
FIG. 5A is an elevated end view of an elongated oval cooler tube with five convolutions formed therein according to the principles of the present disclosure.
FIG. 5B is a side cross-sectional view of the elongated oval cooler tube of FIG. 5A taken along line A-A of FIG. 5A and looking in the direction of the arrows of line A-A.
FIG. 5D is an enlarged cutaway view of the portion of the elongated oval cooler tube of FIG. 5B inside circle B of FIG. 5B.
Figure 5C:
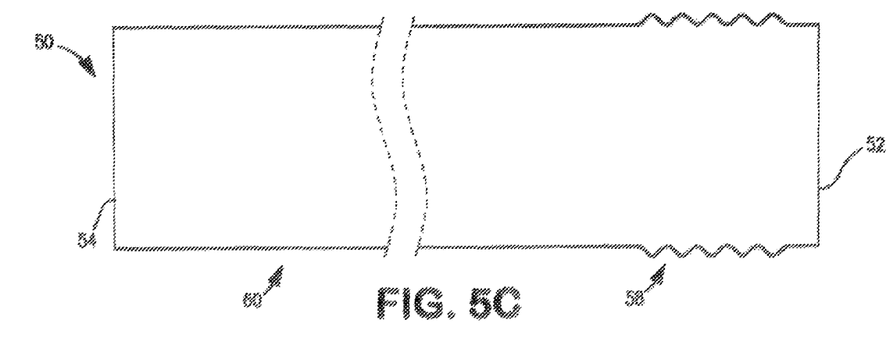
FIG. 5C is a top plan cross-sectional view of the elongated oval cooler tube of FIG. 5B taken along line C-C of FIG. 5C and looking in the direction of the arrows of line C-C.

With further references to FIGS. 4-5, each cooler tube assembly 30 of exhaust gas recirculation cooler 20 includes a tube 50. Tube 50 is an elongated hollow tube extending between first and second ends 52, 54 and having a substantially oval shaped cross-section. Proximate first end 52, one or more convolutions 56 are integrally formed in tube 50. The one or more convolutions 56 constitute the integral, relatively flexible portion 58 of tube 50. The substantial, integral remainder of tube 50 constitutes the main cooling portion 60 thereof. Preferably, tube 50 comprises stainless steel.

Figure 1:
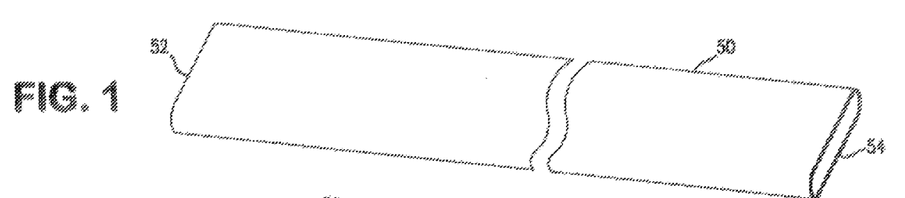
FIG. 1 of the drawings is a perspective view of an elongated oval cooler tube according to the principles of the present disclosure.
Figure 2:
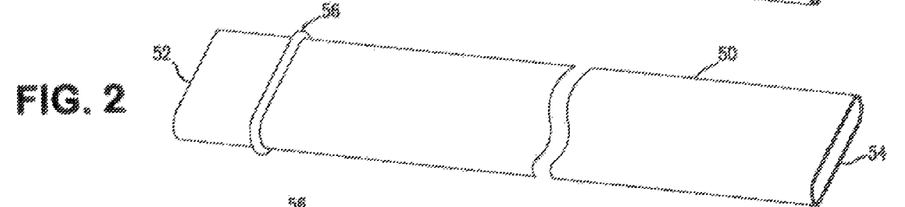
FIG. 2 is a perspective view of an elongated oval cooler tube with one convolution formed therein according to the principles of the present disclosure.
Figure 3:
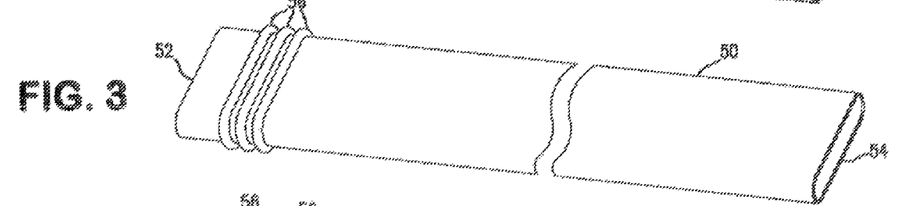
FIG. 3 is a perspective view of an elongated oval cooler tube with three convolutions formed therein according to the principles of the present disclosure.

With further reference to FIGS. 1-4, the formation of tube 50, according to the principles of the present disclosure, is illustrated. As shown in FIG. 1, tube 50 begins as an elongated, substantially oval tube with no convolutions. In one preferred embodiment, as shown in FIG. 2, a first convolution 56 is integrally formed in tube 50 spaced apart from first end 52. As shown in FIGS. 3-4, successive convolutions 56 are formed, one after another, each being positioned closer towards first end 52. A preferred method of conducting such a successive, integral formation of convolutions 56 in tube 50 is through mechanical bulging of tube 50. As illustrated in detail in FIG. 5D, convolutions 56 are preferably formed such that the wall thickness 62 of cooling portion 60 of tube 50 is substantially similar or equal to the wall thickness 64 of convolutions 56.

It should be understood than the method of forming convolutions 58 in tube 50 can vary according to the principles of the present disclosure. For example, in another preferred embodiment, multiple convolutions 56 are formed simultaneously through hyrdoforming.

Figure 6A:
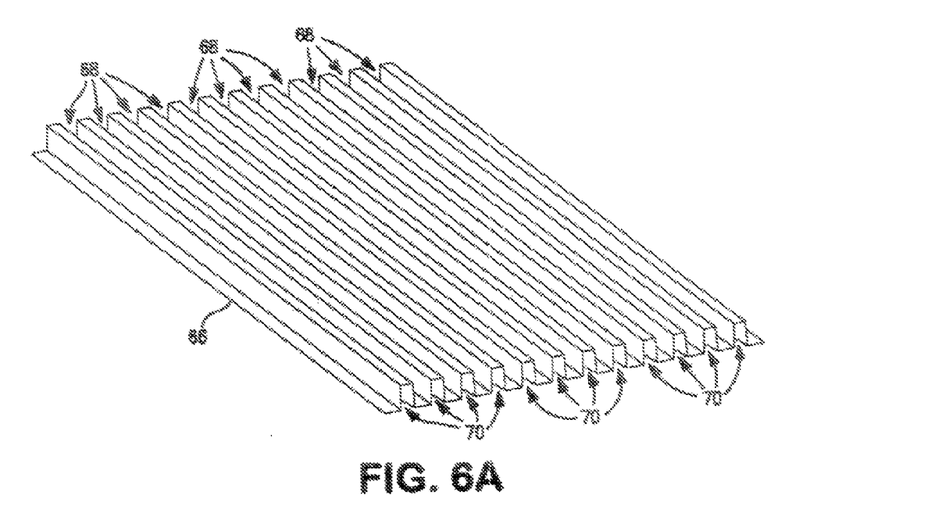
FIG. 6A is a perspective view of a fin sheet according to the principles of the present disclosure.
Figure 6B:
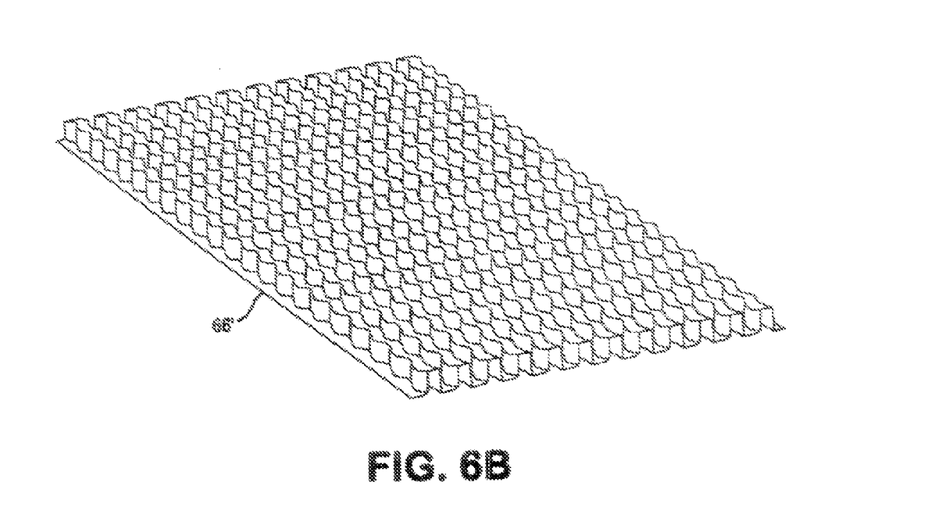
FIG. 6B is a perspective view of an alternative fin sheet according to the principles of the present disclosure.
Figure 7A:
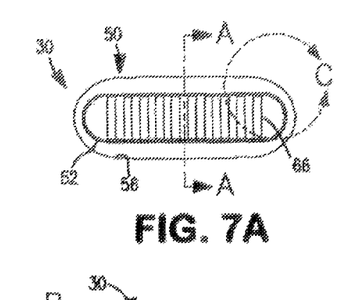
FIG. 7A is an elevated and view of an elongated oval cooler tube, fin sheet and film assembly according to the principles of the present disclosure.
Figure 7B:
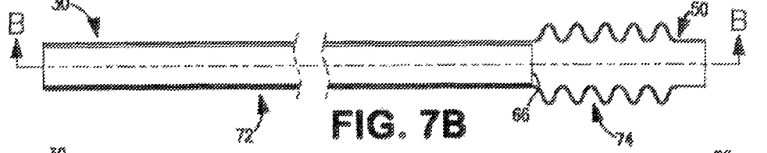
FIG. 7B is an elevated side cross-sectional view of the elongated oval cooler tube, fin sheet and film assembly of FIG. 7A taken along line A-A of FIG. 7A and looking in the direction of the arrows of line A-A.
Figure 7C:
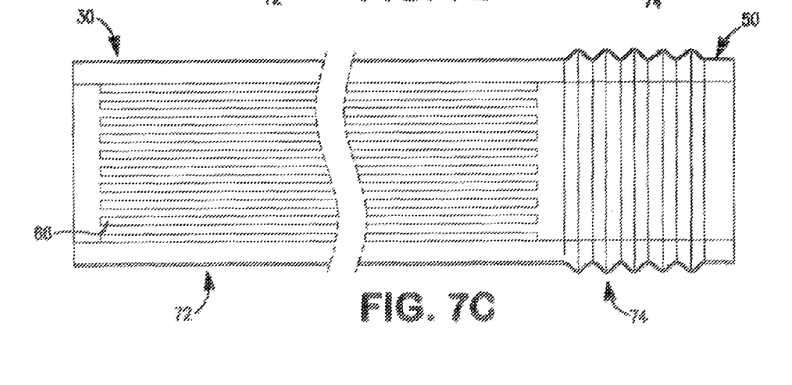
FIG. 7C is a top plan cross-sectional view of the elongated oval cooler tube, fin sheet and film assembly of FIG. 7B taken along line B-B of FIG. 7C and looking in the direction of the arrows of line B-B.
Figure 7D:
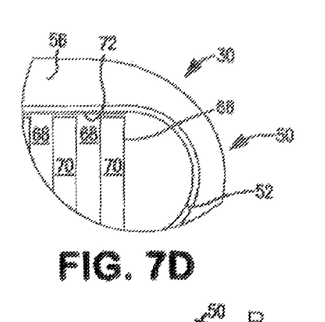
FIG. 7D is an enlarged cutaway view of the portion of the elongated oval cooler tube, fin sheet and film assembly of FIG. 7A inside circle C of FIG. 7A.

Referring to FIG. 6A, exemplary fin sheet or fin module 66 of cooler tube assembly 30 is a relatively thin material which defines sets of longitudinal channels 68, 70 by a laterally alternating U-shaped configuration. Specifically, the upward facing U-shaped portions of fin sheet or fin module 66 define channels 68, the downward facing U-shaped portions of fin sheet 66 define channels 70, and channels 68, 70 alternate laterally across fin sheet 66. Referring to FIG. 6B, an alternative fin sheet or fin module 66' is illustrated, in which includes longitudinal undulations formed in the sheet.

Referring to FIGS. 7A-7D, an exemplary cooler tube assembly 30 includes fin sheet 66 and coupling film 72 (see FIG. 7D, in which the components are spaced apart for illustration purposes) inserted info tube 50, and positioned within main cooling portion 60 of tube 50. If should be understood that multiple sheets of coupling film 72 are positioned on opposing sides of fin sheet 66 between fin sheet 66 and tube 50, so as to provide an attachment interface between tube 50 and fin sheet 66 and to enable bonding of tube 50 and fin sheet 66 through braising or a similar process. When fin sheet 66 is bonded to tube 50, channels 68, 70 of fin sheet 66 define alternating channels within main cooling portion 60 of tube 50. As particularly illustrated in FIGS. 7B and 7C, in a preferred embodiment of the present disclosure, fin sheet 66 is located within main cooling portion 60 of tube 50 and does not extend into flexible portion 58 of tube 50. Fin sheet 66 and main cooling portion 60 of tube 50 collectively comprise tube and fin section 72 of cooler tube assembly 30, while flexible portion 58 of tube 50 comprises flexible section 74 of cooler tube assembly 30. As tube and fin section 72 preferably constitutes substantially more of cooler tube assembly 30 than flexible section 74, cooler tube assembly 30 imparts the known relatively high power density—greater temperature reduction per a given volume—characteristics of tube and fin architecture to exhaust gas recirculation cooler 20.

With further reference to FIGS. 10A-10C, exhaust gas recirculation cooler 20 a plurality of cooler tube assemblies 30 encased by main body 22 and first and second end plates 24, 26. Cooler tube assemblies 30 are respectively received in tube apertures 80 of first end plate 24 and tube apertures 82 of second end plate 28. In a preferred embodiment of the present disclosure, the components of individual cooler tube assembles 30, as well as cooler tube assemblies 30 and first and second end plates 24, 26, respectively are permanently bonded to one another contemporaneously, such as in a single braising process.

With particular reference to FIGS. 10B and 10C, cooler tube assemblies 30 are spaced apart within main body 22, so that coolant may travel in between cooler tube assemblies 30 and assist in transferring heat from exhaust gases passing through cooler tube assemblies 30. Additionally, according to the principles of the present disclosure, upon thermal expansion of cooler tube assemblies 30, such as under abnormal, thermal shook operating conditions for exhaust gas recirculation cooler 20, each individual cooler tube assembly 30 can be displaced at its respective flexible section 74 to accommodate expansion occurring in that cooler tube assembly 30—independent of the other cooler tube assemblies. The displacement of any individual cooler tube assembly 30 at its respective flexible section 74 limits the forces exerted by that cooler tube assembly 30 on first and second end plates 24, 26, and thus the stresses in first and second end plates 24, 26, during thermal expansion of that cooler tube assembly 30.

By limiting the forces exerted by any individual cooler tube assembly 30 on first and second end plates 24, 26 during thermal expansion of that cooler tube assembly 30, exhaust gas recirculation cooler 20 inhibits coolant leaking which may arise out of a failure or crack at first and second end plates 24, 26—and thus helps prevent decreases in engine performance, decreases in cooling system performance, and/or decreases in exhaust gas recirculation performance. Moreover, as each individual cooler tube assembly 30 can be displaced at its respective flexible section 74 independent of the other cooler tube assemblies, exhaust gas recirculation cooler 20 is capable of responding to a relatively wide range of thermal shock conditions—which are typically non-uniform in nature and, thus, require varied performance across exhaust gas recirculation cooler 20.

As exemplified herein, the present disclosure can vary in many ways. For example, if should be understood that an exhaust gas recirculation cooler according to the principles of the present disclosure can be used in a variety of constructions for a variety of vehicular applications. Additionally, the materials and shapes of the components of an exhaust gas recirculation cooler according to the principles of the present disclosure can vary, and remain within the scope of this invention. Accordingly, it is to be understood that the present disclosure is exemplary in nature.

What is claimed is:

1. An improved exhaust gas recirculation cooler comprising:
    an elongated, hollow main body;
    first and second end plates coupled to opposing ends of said main body; and
    at least one cooler tube assembly coupled between said first and second end plates, said at least one cooler tube assembly including at least one elongated tube member with a substantially oval cross-sectional shape and a fin sheet having first and second longitudinal ends, said fin sheet extending into at least a portion of said tube member,
    said at least one tube member extending beyond at least one of said first and second ends of said fin sheet to describe an unoccupied oval tube region having at least a first convolution integrally formed therein, said first convolution defining a relatively flexible section of said at least one cooler tube assembly, said tube member and said fin sheet being restrainably bonded within a relatively rigid section of said at least one cooler tube assembly, separate from and integrated with said relatively flexible section of said at least one cooler tube assembly,
    wherein said relatively flexible section of said at least one cooler tube assembly displaces upon thermal expansion of said at least one cooler tube assembly, to limit mechanical stresses proximate said first and second end plates.

2. The improved gas recirculation cooler of claim 1, in which the invention comprises a plurality of cooler tube assemblies coupled between said first and second end plates and spaced apart from one another, each of said plurality of cooler tube assemblies including an elongated tube member with a substantially oval cross-sectional shape and a fin sheet extending into at least a portion of said tube member, said plurality of elongated tube members further including at least a first convolution integrally formed therein, said first convolution of each said tube member defining a relatively flexible section of said respective cooler tube assembly, each said tube member of said plurality of tube members including a fin sheet that is restrainably bonded within a relatively rigid section of said cooler tube assembly, separate from and integrated with said relatively flexible section of said respective tube assembly,
    wherein said relatively flexible section of said respective cooler tube assembly displaces independently from the remainder of said plurality of cooler tube assemblies upon thermal expansion of said respective cooler tube assembly, to limit the mechanical stresses generated within said first and second respective end plates.

3. The improved gas recirculation cooler of claim 1 wherein said tube member has a plurality of convolutions integrally formed therein, said plurality of convolutions defining said relatively flexible section of said at least one cooler tube assembly.

4. The improved gas recirculation cooler of claim 1 wherein said tube member has a first thickness at said relatively rigid section of said at least one cooler tube assembly and said tube member has a second thickness at said first convolution, and said first thickness and said second thickness are substantially equal.

5. The improved gas recirculation cooler of claim 1, wherein said first convolution is proximate a first end of said tube member.

6. The improved gas recirculation cooler of claim 1 further comprising:
    an exhaust inlet coupled to a first end of said at least one cooler tube assembly for conducting the flow of exhaust gas, said exhaust inlet configured for coupling to the exhaust manifold of an internal combustion engine; and
    an exhaust outlet coupled to a second end of said at least one cooler tube assembly at a position substantially opposite said first end, said exhaust outlet configured for coupling to the intake manifold of an internal combustion engine.

7. The improved gas recirculation cooler of claim 1 further comprising a coolant inlet and a coolant outlet, each of said coolant inlet and said coolant outlet configured for coupling to the coolant system of an internal combustion engine, wherein said main body includes a coolant inlet aperture fluidly coupled to said coolant inlet and a coolant outlet aperture fluidly coupled to said coolant outlet, such that coolant travels generally longitudinally through said main body between said coolant inlet and said coolant outlet.

8. The improved gas recirculation cooler of claim 1, wherein said tube member is fabricated of stainless steel.

9. The improved gas recirculation cooler of claim 1, wherein said tube member and said fin sheet are restrainably bonded to one another through a braised attachment interface.

10. A method for forming an improved exhaust gas recirculation cooler, comprising:
    forming an elongated tube with a substantially oval cross-sectional shape;
    integrally forming at least a first convolution in said tube to define an integrated flexible tube portion;
    inserting a fin sheet within said tube, in a position spaced longitudinally apart from said flexible tube portion;
    restrainably bonding the relative positioning of said fin sheet within said tube; and coupling said tube substantially between opposing ends of a cooler case with said flexible tube portion positioned proximate to one of said opposing ends of said cooler case, wherein said flexible tube portion of said tube displaces upon the thermal expansion of said tube.

11. The method for forming an improved exhaust gas recirculation cooler of claim 10, further comprising:

substantially maintaining the thickness of said tube at said first convolution.

12. The method for forming an improved exhaust gas recirculation cooler of claim 10, wherein restrainably bonding said tube and said fin sheet includes braising said fin sheet within said tube.

13. The method for forming an improved exhaust gas recirculation cooler of claim 10, wherein integrally forming at least said first convolution in said tube to define said integrated flexible tube portion includes mechanically bulging said first convolution.

14. The method for forming an improved exhaust gas recirculation cooler of claim 10, further comprising successively integrally forming a second convolution in said tube, said first and second convolutions collectively defining said integrated flexible tube portion.

15. The method for forming an improved exhaust gas recirculation cooler of claim 10, further comprising contemporaneously integrally forming at least said first convolution and a second convolution in said tube, said first and second convolutions collectively defining said integrated flexible tube portion.

16. The method for forming an improved exhaust gas recirculation cooler of claim 10, wherein integrally forming at least said first convolution in said tube to define said integrated flexible tube portion includes hydroforming of said first convolution.

* * * * *